United States Patent [19]

Farrell

[11] Patent Number: 4,699,292

[45] Date of Patent: Oct. 13, 1987

[54] PULP BLEACHING TOWER PRESSURE RELIEF HATCH

[75] Inventor: John P. Farrell, Paducah, Ky.

[73] Assignee: Westvaco Corporation, New York, N.Y.

[21] Appl. No.: 898,231

[22] Filed: Aug. 20, 1986

[51] Int. Cl.⁴ .......................................... B65D 23/00
[52] U.S. Cl. ..................... 220/344; 49/484; 49/485; 52/192; 52/204; 114/201 R; 220/378
[58] Field of Search .............. 52/192, 196, 200, 204, 52/64, 72; 105/308 A, 377; 114/201 R, 201 A; 49/484, 485, 62, 63; 220/344, 378; 162/233, 246

[56] References Cited

U.S. PATENT DOCUMENTS

| | | | |
|---|---|---|---|
| 513,302 | 1/1894 | Canda | 49/484 |
| 866,439 | 9/1907 | DeCanio | 49/484 |
| 1,848,954 | 3/1932 | Jarvis | 220/319 |
| 2,141,481 | 12/1938 | Mattingley | 105/377 |
| 2,236,315 | 3/1941 | Gray | 49/484 |
| 2,360,276 | 10/1944 | Redmond | 114/201 A |
| 2,488,796 | 11/1959 | Baier | 114/201 R |
| 2,499,828 | 3/1950 | Kuriloff | 292/106 |
| 2,551,750 | 5/1951 | Liskey, Jr. | 114/201 R |
| 2,592,412 | 4/1952 | Frohnopel | 220/334 |
| 2,745,362 | 5/1956 | Lunde | 105/377 |
| 3,037,251 | 6/1962 | Landis | 49/476 |
| 3,401,647 | 9/1968 | Ingram | 105/377 |
| 4,004,538 | 1/1977 | Schoonman | 114/201 R |

FOREIGN PATENT DOCUMENTS 20444 of 1895 United Kingdom ............... 220/344

Primary Examiner—John E. Murtagh
Assistant Examiner—Andrew Joseph Rudy
Attorney, Agent, or Firm—W. A. Marcontell; R. L. Schmalz

[57] ABSTRACT

An overflow hatch for confining low pressure volumes of paper pulp bleaching chemicals is provided with a double O-ring seal arrangement that sustains the hatch seal integrity as the O-ring material deteriorates from reactive effect of the bleaching chemical. The hatch seal integrity resulting from an annular clearance space extending radially between a cylindrical plug surface and an internal bore of a coaming, where the radial dimension of said annular clearance space is substantially equal to the thickness of a second O-ring tube situated in a seating groove in said plug.

2 Claims, 4 Drawing Figures

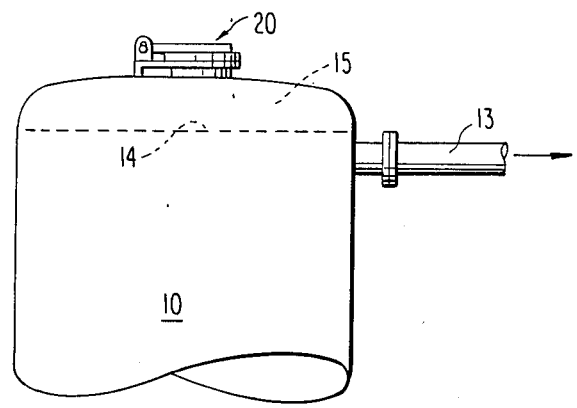
FIG. 1
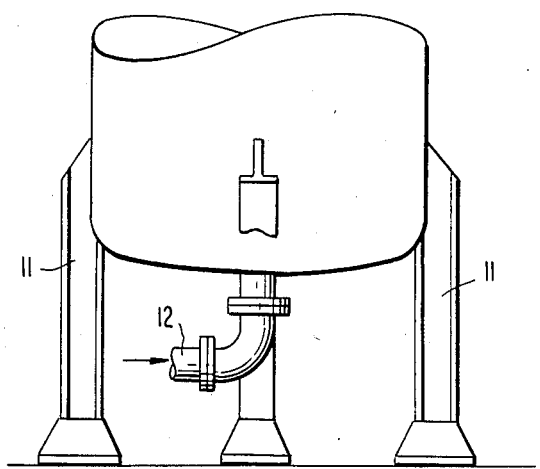
FIG. 4
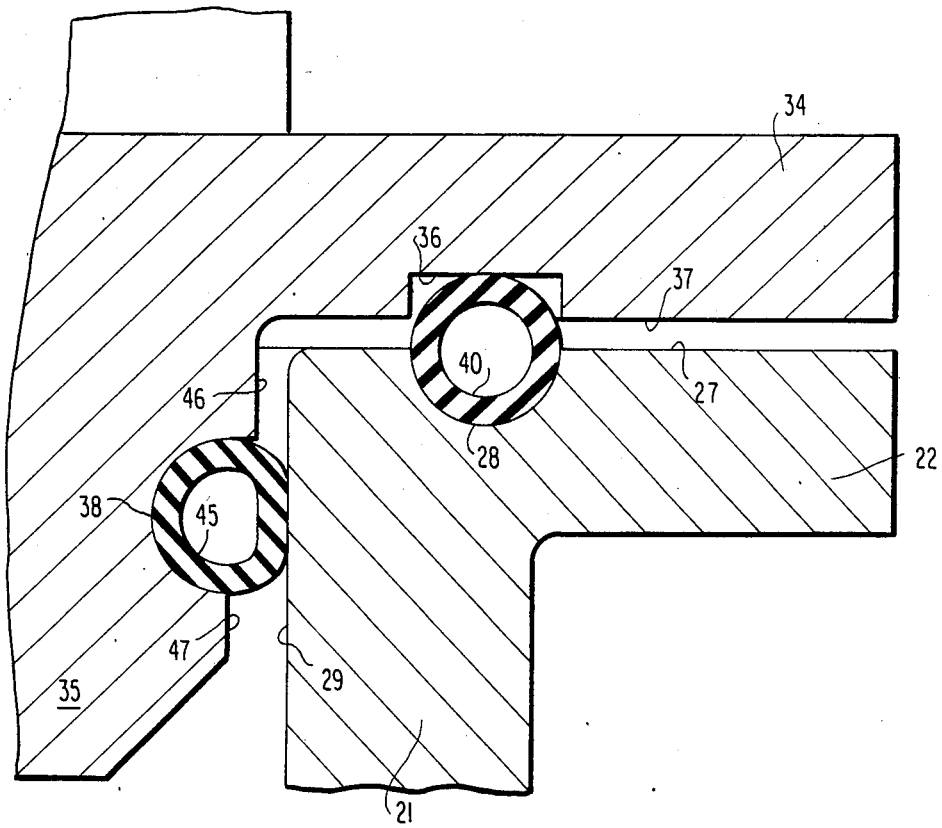

PULP BLEACHING TOWER PRESSURE RELIEF HATCH

BACKGROUND OF THE INVENTION

1. Field of the Invention

The present invention relates to structural portal covers and in particular, to an overflow hatch construction for paper pulp bleaching towers.

2. Description of the Prior Art

Paper pulp bleaching towers are vertically elongated tubes or vessels of about 10 feet in diameter and 20 to 40 feet high. Aqueous wood pulp is blended with an appropriate reaction chemical such as chlorine, chlorine dioxide, sodium hydroxide or oxygen and pumped into the bottom of the bleaching tower where the chemical acts upon the lignin or cellulose constituents of the pulp. The process described is a continuous flow process which requires a finite residence or reaction time for the reactive chemical to accomplish the desired objective. This reaction time is gained by the slow linear progression of the pulp along the tower vessel length.

Often, as in the case of chlorine and oxygen, the reaction chemical is blended as a gas and at least some pressure is desired to drive the gas into solution with the aqueous pulp. This pressure at the blending point is provided by the vessel height.

Ideally, by the time the blended pulp reaches the top of the bleaching tower, all the reaction chemical has reactively combined with the pulp and no free gas remains. In practice, however, an excess of chemical is required to assure that all the pulp is reacted. By the time a given increment of blended pulp reaches the vessel top, undissolved or unreacted chemical breaks free of the aqueous mixture to form a gaseous pocket under the vessel top cap. The pulp flows, unpressurized through a withdrawal pipe that penetrates the vessel wall below the top.

In the unusual case, pulp flow must be temporarily interrupted and depending on the interruption sequence, withdrawal may be interrupted prior to influx. This circumstance raises the pulp surface level within the tower vessel into the gas pocket. In the extreme case, the rising pulp fills the gas pocket and must be released through an overflow port at the vessel top. A closure for the overflow port is therefore required to confine the gas pocket under normal conditions but will open to release a pulp overflow and thereafter, close when conditions return to normal.

Such a port closure is normally characterized as a relief hatch which is merely a hinged door across the overflow portal with a flat gasket seal face.

The difficulties with prior art hatch designs arises first from the adhesive characteristic of the pulp fiber which has a strong adhesive affinity to most surfaces and therefore contaminates the hatch seal surface to prevent gas confinement after an overflow.

A second difficulty with prior art bleach tower hatches is the highly reactive nature of the chemicals used. Given sufficient time, most gasket materials deteriorate, in one form or another, from the chemical attack.

It is, therefore, an object of the present invention to provide a pulp bleaching tower hatch that will effectively seal the gas pocket in the tower top from loss to the atmosphere.

Another object of the invention is to provide a hatch seal that resists pulp contamination or obstruction.

Another object of the invention is to provide a hatch seal design that will maintain an effective seal after partial failure from chemical attack.

SUMMARY OF THE INVENTION

These and other objects of the invention, as will be subsequently apparent, are accomplished by a plug type portal closure having a translatable hinge axis for opening. O-ring type seals are applied on the cylindrical plug surface and on an annular face planar surface. The O-rings are formed from chemically resistant tubing that deteriorates by loss of tensile strength and stiffness. Structural clearance between the cover plug cylinder and the portal coaming bore is determined by the seal tubing wall thickness.

From a closed and sealed position, the hatch cover will not swing open due to structural interference between the cover plug cylinder and the portal coaming bore. Under sustained, uniformly distributed pressure, the hatch cover is lifted vertically to clear the plug element axially from the portal bore until the vertically translated cover hinge axis is positioned to permit a swing opening.

After a pulp overflow, the plug cylinder O-ring wipes the portal bore surface clean upon reentry for a primary, gastight, seal. The face O-ring is seated in an upward facing, lower flange groove and seals against a downward facing groove in the cap flange.

As the primary plug O-ring deteriorates, it becomes soft and is either pulled from its seat by plug reentry friction or is extruded from the seating groove by gas pressure. In either case, the O-ring must stretch to pull out of the seating groove on to the larger diameter plug cylinder portion above the seating groove. This stretching elongates the partially failed O-ring and reduces the O-ring wall thickness that fills the annular void between the plug cylinder and the portal bore surface.

BRIEF DESCRIPTION OF THE DRAWINGS

Relative to the drawings wherein like reference characters designate like or similar elements throughout the several figures of the drawings:

FIG. 1 is a elevational view of a representative pulp bleaching tower having the present invention hatch attached to the top thereof;

FIG. 4 is a partially sectioned elevation of the present invention.

DESCRIPTION OF THE PREFERRED EMBODIMENT

Figure 2:
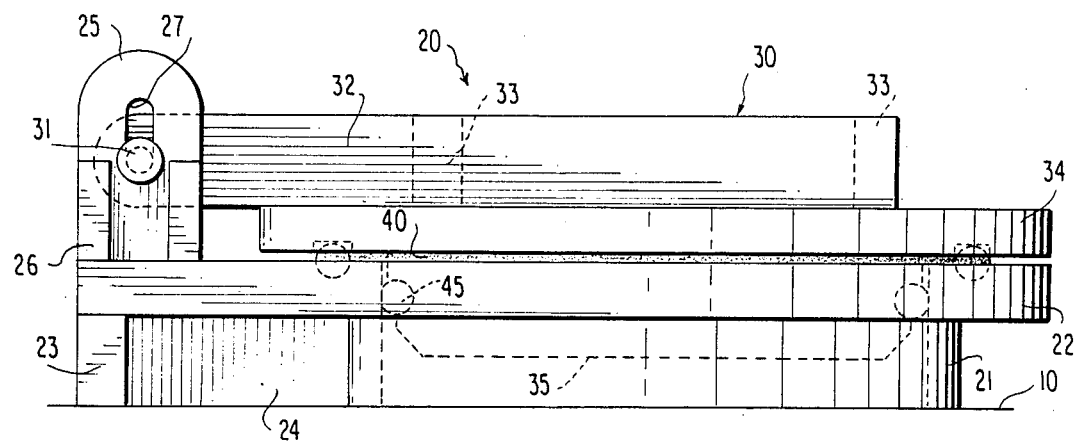
FIG. 2 is an elevational detail of the present invention.

The use environment of the invention is shown by FIG. 1 to include a vertically elongated, tubular vessel 10 of 20 to 40 feet height and about 10 feet diameter. Suspension structures 11 support a lower end clearance for physical access of an influx flow pipe 12 through which chemically blended paper pulp is pumped against the hydraulic head within the vessel.

Near the top of the vessel is provided a discharge conduit 13 which determines the standing position of the pulp surface level 14 within the vessel. Above the surface level is provided gas pocket space 15 under the vessel end cap.

Figure 3:
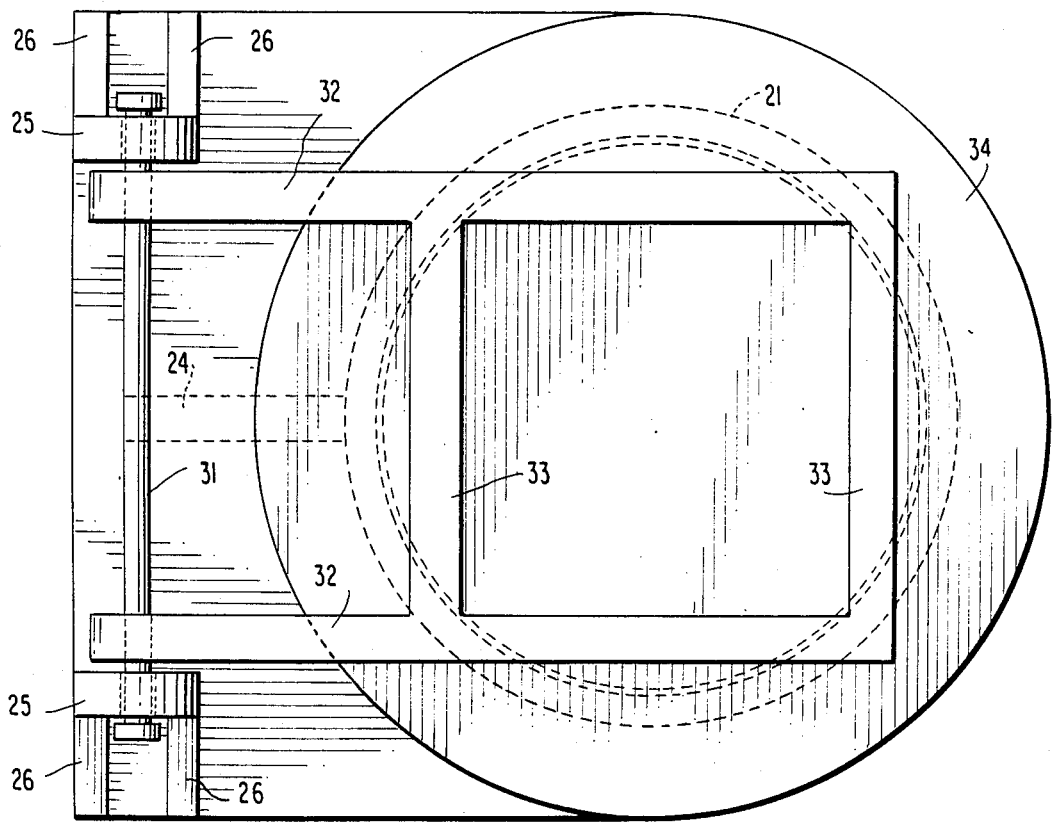
FIG. 3 is a detailed plan view of the present invention.

Covering an overflow port in the upper vessel end cap is a low pressure, gas tight hatch 20 to prevent escape of the bleaching chemical gas into the atmosphere under normal operating conditions. The hatch construction is shown in greater detail by FIGS. 2, 3 and 4. The preferred construction material for the hatch 20 is laminated fiberglass due to the relative unreactivity thereof to the chemicals involved. However, some metals such as certain stainless steels, and other plastics may be appropriate.

As an integral extension of the tank 10 end cap, the hatch combination is assembled upon a coaming base which includes a cylindrical tube port 21, a flanged end-face 22, and reinforcing ribs 23 and 24. Projecting up from the flanged end-face are a pair of hinge lugs 25 that are stabilized and reinforced by gussets 26. Within each lug is an axle slot 27. The axle slot length will subsequently become apparent.

A hatch cover 30 is pivotally secured to the axle lugs 25 by an axle shaft 31 which passes through the axle lug slots 27 and aligned apertures in the respective distal ends of swing arms 32. Cross-braces 33 link the two swing arms 32 together as a box frame.

The cover flange 34 is also structurally integral with the box frame 33 and includes a plug cylinder portion 35.

A double O-ring sealing arrangement between the hatch cover and coaming is shown in detail by FIG. 4. Here, it is seen that the upper, planar face 27 of the coaming flange 22 is provided with a circular groove ring seat 28 of semicircular cross-section. Opposite of the ring seat 28, is a rectangular section groove 36 in the lower, planar face 37 of the cover flange 34. Within the ring seat 28 is disposed an O-ring seal element 40 which is fabricated from a chemically resistant, relatively soft vinyl elastomer tubing of heavy wall thickness such as TYGON ®. For example, TYGON ® tubing of 1 inch O.D. has a ¾ inch C.D. and a wall thickness of ⅛ inch.

A second or primary seal ring 45 is seated in a circular groove 38 of semicircular cross-section around the plug cylinder 35. The cylinder perimeter above the seal ring 45, surface 46, has a greater outside diameter than the perimeter 47 below the seal ring. The clearance space difference between plug cylinder surface 46 and the inside diameter of the coaming cylinder wall 29 is substantially the same as the wall thickness of the primary seal ring 45.

As suggested previously, the length of the axle slots 27 in the hinge lugs 25 is determined by the depth of plug 35 and the corresponding fit dimensions. Simply stated, the axle 31 must be free to move axially up from a lower, plug seal position where both the primary and secondary seals 45 and 40 are seated. The distance of axial movement upward until the lower plug structure will clear the internal port bore 29 by rotation about the axle 31 axis is the slot 27 length required.

Selection of the diameter differences between plug surface 46 and bore surface 29 has been suggested as, nominally, the thickness of the O-ring tubing. This dimensional clearance has been determined empirically as that which remains sealed by the O-ring 45 material after it has been softened by chemical reaction and a circumferential portion thereof pulled or extruded from the seat 38. In this case, the internal tubular void is collapsed and the unseated sealant material is distorted into the clearance space. Such stretching may continue until the distorted material of the primary seal 45 abuts the secondary seal material 40. Notwithstanding the unseating and distortion, a primary gas seal is maintained.

Having fully described my invention, I claim:

1. A hatch assembly for a wood pulp bleaching vessel comprising a cylindrical coaming secured to said vessel around a vent port opening, a flange secured to said coaming having a planar face disposed perpendicular to the axis of said coaming, a hinged cover for said vent port pivotally secured to said coaming for swinging about a hinge axis parallel with said coaming flange face, a cylindrical plug portion of said cover projecting from a planar flange portion of said cover for insertion into an internal bore of said coaming when said cover flange is adjacently parallel with said coaming flange, a first O-ring seating groove in the face of said coaming flange around the circumference of said bore, a second O-ring seating groove in said cover flange opposite of said first seating groove, and a third O-ring seating groove in and around a cylindrical surface of said plug, an annular clearance space extending radially between said plug cylindrical surface and the internal bore of said coaming and axially between said coaming flange face plane and said third O-ring seating groove, a first vinyl tube O-ring seated in and projecting from said first seating groove into said second seating groove, and a second vinyl tube O-ring seated in and projecting from said third O-ring groove, said second O-ring tube having a wall thickness substantially the same as the radial dimension of said annular clearance space.

2. A hatch assembly as described by claim 1 wherein the pivot axis of said hinged cover translates linerly form a cover sealed position whereat said first O-ring is in sealing contact with said second O-ring seating groove to a second position whereat said cover flange may be rotated about said hinge axis away from said coaming flange.

* * * * *